United States Patent
Jung et al.

(10) Patent No.: US 6,177,215 B1
(45) Date of Patent: Jan. 23, 2001

(54) MANUFACTURING METHOD OF A COLOR FILTER SUBSTRATE

(75) Inventors: Sung-Ki Jung; Dong-Uk Choi, both of Suwon (KR)

(73) Assignee: Samsung Electronics Co., Ltd., Kyungki-do (KR)

( * ) Notice: Under 35 U.S.C. 154(b), the term of this patent shall be extended for 0 days.

(21) Appl. No.: 09/157,398

(22) Filed: Sep. 21, 1998

Related U.S. Application Data

(63) Continuation-in-part of application No. 08/563,699, filed on Nov. 28, 1995, now Pat. No. 5,956,109.

(30) Foreign Application Priority Data

Nov. 28, 1994 (KR) .................................................. 94-31471
May 19, 1998 (KR) .................................................. 98-17913

(51) Int. Cl.$^7$ ............................ G02B 5/20; G02F 1/1335
(52) U.S. Cl. ................................................. 430/7; 430/328
(58) Field of Search ........................................ 430/7, 328

(56) References Cited

U.S. PATENT DOCUMENTS

| | | | |
|---|---|---|---|
| 5,482,803 | 1/1996 | Ishiwata et al. | 430/7 |
| 6,004,704 | 12/1999 | Ko | 430/7 |

*Primary Examiner*—John A. McPherson
(74) *Attorney, Agent, or Firm*—Pillsbury Madison & Sutro LLP

(57) ABSTRACT

A light-blocking black matrix is applied to a transparent substrate, then several coats of negative photoresists, with optimal spectral properties, are applied over the black matrix to create red, blue and green color filters. Then, the surface of the black matrix and the red, blue and green filters are preheated using infrared (IR) rays to remove any residual moisture or gas. Next, the surfaces of the black matrix and color filters are irradiated by ultraviolet (U.V.) rays to remove pigment residue remaining on the black matrix. This is followed by a UV irradiating step in which high-density ozone molecules ($O_3$) are injected into a UV chamber and any final traces of pigment remaining on the surface are dissolved and volatilized in reaction to active oxygen from the ozone.

11 Claims, 5 Drawing Sheets

FIG.3

| weight | crack percent of layers | |
|---|---|---|
| less than/5gf | more than 90% | very weak |
| 15 ~ 20gf | ≒ 15% | weak |
| 20 ~ 30gf | less than 1% | good |
| more than 30gf | ≒ 0% | very good |

MANUFACTURING METHOD OF A COLOR FILTER SUBSTRATE

CROSS-REFERENCE

The present application is a continuation in part of the application Ser. No. 08/563,699 filed Nov. 28, 1995, entitled "METHOD OF FABRICATING COLOR FILTERS USED IN A LIQUID CRYSTAL DISPLAY", by the inventor Sung-Ki Jung (attorney docket number221 571-OPP95), now U.S. Pat. No. 5,956,109. This application is incorporated herein by this reference.

BACKGROUND OF THE INVENTION

1. Field of the Invention

The present invention relates to manufacturing method of a color filter substrate, and more particularly, facing a thin film transistor substrate in a liquid crystal display.

2. Description of the Related Art

In general, a liquid crystal display includes two substrates that have electrodes and face each other, a liquid crystal material therebetween, and a sealant sealing the liquid crystal material.

One of the two substrates has a black matrix and red, green and blue color filter, and the other has a plurality of thin film transistors (TFTs) and pixel electrodes.

FIG.1 is a cross-sectional view of two substrates in a liquid crystal display (LCD).

As shown in FIG.1, a black matrix 2, partially covered by color filters 3 in the display region P and another black matrix 21 are formed on a color filter substrate 1. An indium tin oxide (ITO) layer 4 is overlaid on the color filters 3 and the black matrices 2 and 21.

A thin film transistor substrate 5, which is facing opposite the foregoing substrate 1, has a passivation layer 6 on the facing side.

A sealant 8 joins the two opposing substrates 1 and 5. A liquid crystal material 7 is then injected into the space between the two facing substrates 1 and 5.

Referring to FIG. 1, a conventional manufacturing method of an LCD will be described, emphasizing a manufacturing method of a color filter substrate.

A layer of chromium is sputtered on a transparent substrates 1 to a thickness between 500 to 2000 Å to create black matrices 2 and 21, which prevent TFTs from being degraded from exposure to light.

A photoresist, with optimal spectral properties, is coated thereover, and developed to form a red color filter 3.

Blue and green color filters 3 are formed in the same manner as the red color filter 3.

An ITO layer 4 is formed on the substrate 1 having color filters 3, thus completing the color filter substrate 1.

Finally, a liquid crystal display is completed by applying a sealant 8 on the edge of one of the two substrates 1 and 5, joining the two facing substrates 1 and 5, and injecting a liquid crystal material 7 between the two opposing substrates 1 and 5.

However, in the application of conventional manufacturing methods of LCDs, the adhesive strength between the color filters, the black matrices, and the ITO layer is compromised by either residual pigment remaining on the surface of the black matrix, and/or any moisture or gas in the color filters remaining from the evaporation when forming the ITO layer.

SUMMARY OF THE INVENTION

It is an object of the present invention to reinforce the adhesive strength between color filters and a black matrix, and an ITO layer.

In a manufacturing method of a color filter substrate according to the present invention to achieve this object, the surfaces of a black matrix and color filters are sequentially ashed by infrared (I.R.) rays and ultraviolet (U.V.) rays before forming an ITO layer.

The I.R. irradiation step is used as a preheating process before U.V. irradiation to remove any the moisture or gas remaining in the color filters.

Furthermore, ozone molecules ($O_3$) are injected into the ultraviolet chamber in the U.V. irradiation step so that any pigment residue, remaining on the surface of the black matrix, are dissolved and volatilized in action to active oxygen from ozone.

BRIEF DESCRIPTION OF THE DRAWINGS

FIGS. 3 and 4 are graphs showing adhesive strength of an ITO layer measured in a color filter substrate for a liquid crystal display according to the present invention.

DETAILED DESCRIPTION OF THE PREFERRED EMBODIMENTS

Figure 1:
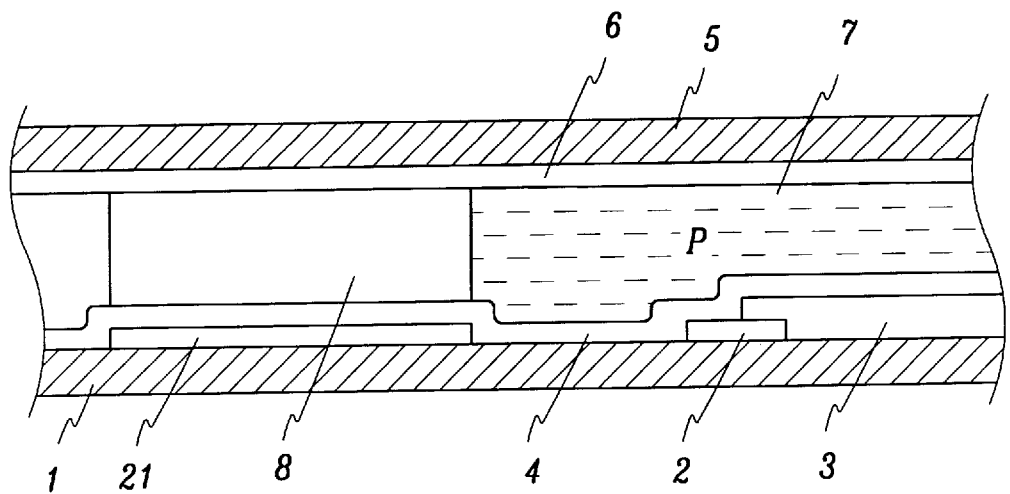
FIG.1 is a cross-sectional view illustrating the junction portion of two substrates in a liquid crystal display.

The present invention will now be described more fully hereinafter with reference to the accompanying drawings, in which preferred embodiments of the present invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity.

FIGS. 2A~2F are cross-sectional views illustrating the manufacturing method of a color filter substrate for an LCD according to the present invention.

Figure 2A:
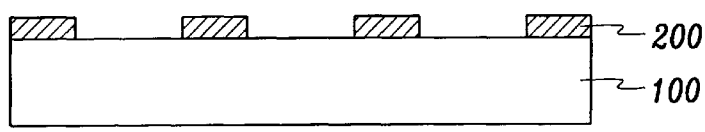
FIGS. 2A~2F are cross-sectional views illustrating the manufacturing method of a color filter substrate for an LCD according to the present invention.

As shown in FIG. 2A, a layer of preferably chromium, but opaque metal or resin can also suffice, is sputtered onto a transparent substrate 100 to a thickness between 500 to 2000 Å to create a black matrix 200. This prevents the TFTs on the opposing substrate from being degraded from exposure to light.

Figure 2B:
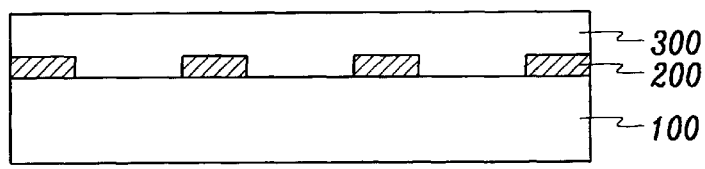

Next, as shown in FIG. 2B, a negative photoresist 300, with an optimal red spectral property, is coated over the black matrix 200, which is adhered to the substrate 100.

The negative photoresist 300 transmits light only having a red-color wavelength, and absorbs all other light. It is made from a color photosensitive acrylic resin with a dispersion of a pigment.

Figure 2C:
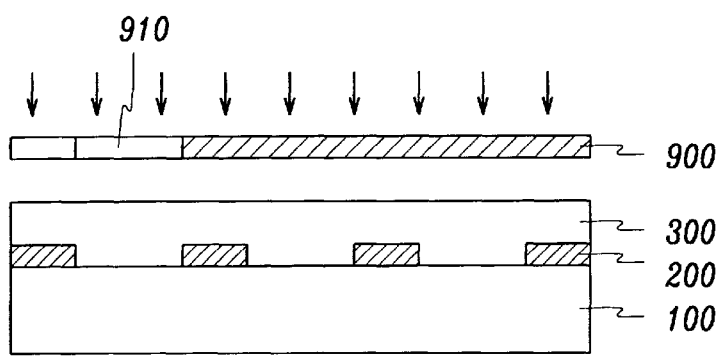

In FIG. 2C, an aperture 910 of a mask 900 is aligned over the substrate 100 to expose only a small portion of the photoresist 300, which is overlaid on the black matrix 200. The photoresist 300 is then exposed to light and developed to form a red color filter 310 as illustrated in FIG. 2D.

Figure 2D:
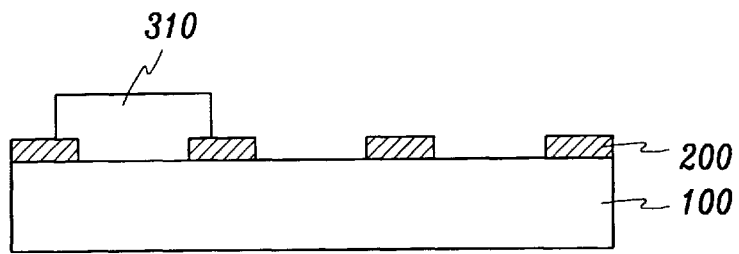
Figure 2E:
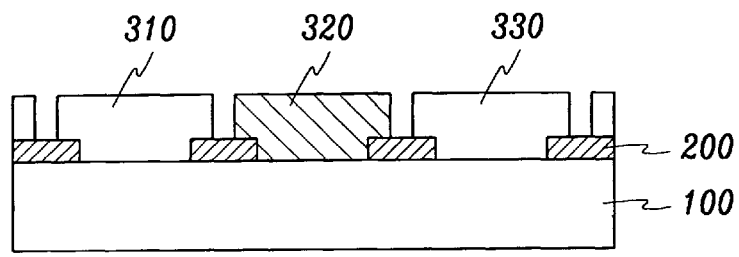

A blue filter 320 and a green filter 330 are formed following the same steps illustrated in FIG. 2C and FIG. 2D, but with slight adaptations. A photoresist with optimal blue spectral properties are used for the blue filter 320, and a photoresist with optimal green spectral qualities are used for the green filter 330. The mask 900 is shifted slightly over the substrate 100 each time to properly align the aperture 910 for each color.

Thus, the red, blue and green color filters 310, 320 and 330 are separated from each other, yet overlap the edges of the black matrix 200.

Next, the surfaces of the black matrix 200 and color filters 310, 320 and 330 are sequentially ashed by I.R. and U.V. rays to reinforce the adhesive strength between the black matrix 200 and the color filters 310, 320 and 330, and also to an ITO layer, whose formation is described below.

The I.R. irradiating step is a preheating process before the U.V. irradiation. This process removes any the moisture or gas remaining in the red, blue and green color filters 310, 320 and 330.

Furthermore, ozone molecules ($O_3$) are injected into the U.V. chamber in the U.V. irradiation procedure where any residual traces of pigment remaining on the surface of the black matrix 200 are dissolved and volatilized in reaction to active oxygen from ozone.

The preferred roughness of the surface of the color filters 310, 320 and 330 is less than 1,000 Å when executing the I.R. and the U.V. ashing procedure.

Next, to complete the color filter substrate 100, an ITO layer 400 is formed with a thickness of 500 to 2,500 Å over the red, blue and green color filter layers 310, 320 and 330, and over the black matrix 200.

Since any residual moisture, gas or pigment remaining in the red, blue and green color filters 310, 320 and 330 or on the surfaces of the black matrix 200 are removed, the adhesive strength between the black matrix 200 and the color filters 310, 320 and 330, and the ITO layer 400 is reinforced.

The adhesive strength of the ITO layer 400 was measured by using a scratch tester, which is described below.

Figure 4:
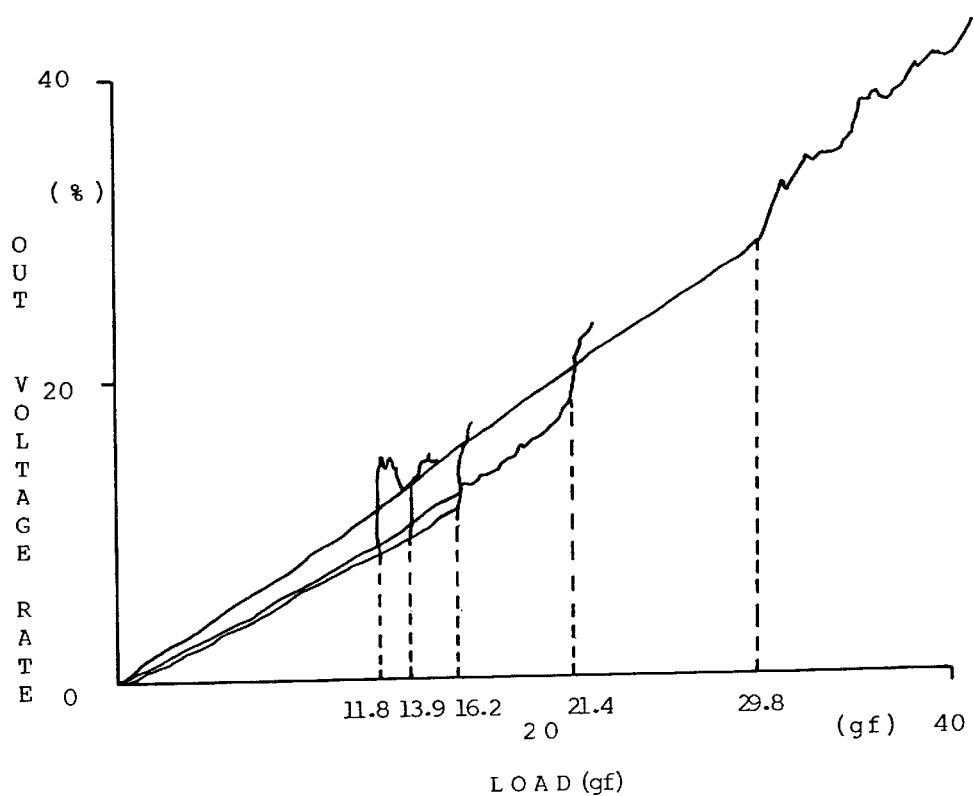

In FIG. 3, the chart shows how often the ITO layer detaches from the color filter substrate according to the embodiment of the present invention when pressure is applied using a scratch tester. FIG. 4 charts the adhesive strength of the ITO layer.

The results in FIG. 4 show that when a scratch test with a pressure of 15 gf is applied to the ITO layer, more than 90% of the ITO layer detach from the color substrate. That is, when slight pressure is applied, the adhesive strength is weak. When a pressure of 15–20 gf is applied, 85% of the ITO layer detach. The adhesive strength does not increase substantially when slightly more pressure is applied. However, when even more pressure is applied, 20–30 gf, only 1% of the ITO layer detach. And finally, in cases where the pressure exceeds 30 gf, there is no detachment at all. As more pressure is applied to the ITO layer, the integrity of the adhesion increases. Therefore, to increase adhesive strength, a pressure of more than 20 gf should be applied.

The horizontal axis in FIG. 4 indicates a pressure applied to the pin which is connected to the scratch tester in gf, and the vertical axis indicates the output voltage rate of the scratch tester in %.

As shown in the graph, the pressure of the adhesive strength was 11.8gf and 13.9 gf respectively in absence of I.R. and U.V. ashing. The pressure was 21.4 gf and 29.8 gf respectively in case of applying I.R. and U.V. ashing. It acknowledges that the adhesive strength becomes stronger.

Furthermore, the contact resistance between the ITO layer 400 and the black matrix 200 is remarkably reduced since executing the I.R. and U.V. ashing eliminates any traces of pigment residual from the surface of the black matrix 200.

Figure 2F:
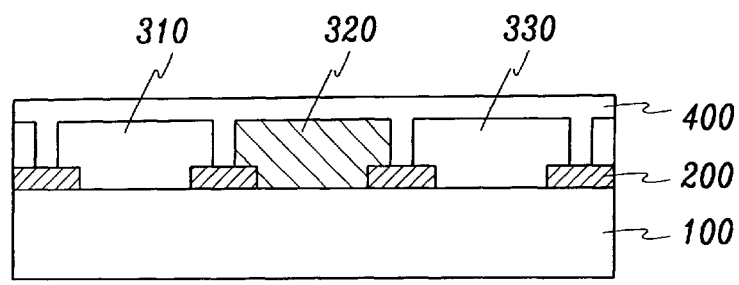

FIG. 2F illustrates the structure of the color filter substrate of a LCD manufactured according to the embodiment of the present invention.

As shown in FIG. 2F, a substrate 100 has a first layer of a black matrix 200 spaced evenly apart. In the second layer, the red, blue, and green color filters 310, 320 and 330, respectively, made of photosensitive resist, are overlaid so they are spaced evenly apart on the same plane and the edges overlap the edges of the black matrix. On the final layer, the ITO layer 400 covers both the color filters 310, 320, 330 and the black matrix 200.

In the manufacturing method of the color filter substrate according to the present invention, traces of moisture, gas or pigment residue remaining in the color filters or on the surfaces of the black matrix are removed by executing I.R. and U.V. ashing on the surfaces of the black matrix and the color filters before forming the ITO layer. Accordingly, the quality of a liquid crystal display is improved by reinforcing the adhesive strength of the color filters and the black matrix, to the ITO layer. Any separation between the two substrates, or detachment of the ITO layer from the color filters and the black matrix disappear. Furthermore, contact resistance between the ITO layer and the black matrix is reduced by removing any pigment residue on the surface of the black matrix.

What is claimed is:

1. A manufacturing method of a color filter substrate for a liquid crystal display (LCD) comprising:

depositing an opaque layer on a transparent substrate and patterning the layer to form a black matrix;

repeatedly coating negative photoresists with an optimum spectral property on the surface of the substrate and patterning the photoresists to form red, blue and green color filters;

executing infrared and ultraviolet ashing on the surfaces of the black matrix and the red, blue and green color filters after forming the red, blue and green color filters; and forming an indium tin oxide layer on the substrate having the black matrix and the red, blue and green color filters.

2. The manufacturing method of claim 1, wherein ozone is injected in U.V. chamber in the infrared and ultraviolet ashing step.

3. The manufacturing method of claim 1, wherein the roughness of the surfaces of the red, blue and green color filters is less than 1,000 Å.

4. The manufacturing method of claim 1, wherein the thickness of the indium tin oxide layer is in the range of 500~2,500 Å.

5. The manufacturing method of claim 1, wherein the thickness of the black matrix is in the range of 500~2,000 Å.

6. The manufacturing method of claim 5, wherein infrared and ultraviolet ashing are sequentially executed.

7. A manufacturing method of a color filter substrate for a liquid crystal display (LCD) comprising:

depositing an opaque layer on a transparent substrate and patterning the layer to form a black matrix;

repeatedly coating negative photoresists with an optimum spectral property on the surface of the substrate and patterning the photoresists to form red, blue and green color filters;

executing a first irradiation step to remove a moisture or gas in the red, blue and green color filters;

executing a second irradiation step to remove a residual of pigment remaining on the surfaces of the black matrix and the red, blue and green color filters; and forming an indium tin oxide layer on the substrate having the black matrix and the red, blue and green color filters.

8. The manufacturing method of claim 7, wherein infrared rays is used in the first irradiation step.

9. The manufacturing method of claim 7, wherein ultraviolet rays is used in the second irradiation step.

10. The manufacturing method of claim 7, wherein the first and the second irradiation steps are executed after forming the red, blue and green color filters.

11. The manufacturing method of claim 7, wherein the first and the second irradiation steps are sequentially executed.

* * * * *